United States Patent
Noh et al.

(10) Patent No.: US 9,307,135 B2
(45) Date of Patent: Apr. 5, 2016

(54) ELECTRONIC VIEWFINDER CAPABLE OF PROVIDING VARIOUS PHOTOGRAPHING ANGLES TO A USER, AND PHOTOGRAPHING APPARATUS USING THE SAME

(71) Applicant: SAMSUNG ELECTRONICS CO., LTD., Suwon-si, Gyeonggi-do (KR)

(72) Inventors: Seung-tack Noh, Suwon-si (KR); Myung-gyu Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/273,779

(22) Filed: May 9, 2014

(65) Prior Publication Data
US 2015/0029380 A1  Jan. 29, 2015

(30) Foreign Application Priority Data

Jul. 29, 2013  (KR) .................. 10-2013-0089831

(51) Int. Cl.
*G03B 13/08* (2006.01)
*G03B 13/02* (2006.01)
*H04N 5/222* (2006.01)
*H04N 5/225* (2006.01)
*H04N 5/232* (2006.01)
*G03B 13/06* (2006.01)

(52) U.S. Cl.
CPC ............... *H04N 5/232* (2013.01); *G03B 13/02* (2013.01); *G03B 13/06* (2013.01); *H04N 5/2251* (2013.01); *H04N 5/2252* (2013.01)

(58) Field of Classification Search
CPC .................. G03B 13/02; H04N 5/23293
USPC ............ 396/386, 373, 374, 383; 348/333.06, 348/333.09, 341
See application file for complete search history.

(56) References Cited

U.S. PATENT DOCUMENTS

| | | | |
|---|---|---|---|
| 2002/0171748 A1* | 11/2002 | Kim .................. | 348/333.01 |
| 2011/0109785 A1* | 5/2011 | Fukuma et al. ........ | 348/333.06 |
| 2013/0176629 A1* | 7/2013 | Nakayama et al. ......... | 359/696 |

FOREIGN PATENT DOCUMENTS

| | | |
|---|---|---|
| EP | 1 788 801 A1 | 5/2007 |
| JP | 06-22184 A | 1/1994 |
| JP | 08-130665 A | 5/1996 |

(Continued)

OTHER PUBLICATIONS

Extended European Search Report issued for EP 14156268.6 (Mar. 5, 2015).

*Primary Examiner* — Rochelle-Ann J Blackman
(74) *Attorney, Agent, or Firm* — Drinker Biddle & Reath LLP

(57) ABSTRACT

A photographing apparatus is provided. The photographing apparatus includes: a main body including a photographing unit configured to photograph a subject; a first holder fixed to the main body; a viewfinder including a display unit and an ocular portion configured to view an image of the subject displayed on the display unit, wherein the viewfinder is supported by the first holder such that the ocular portion is slid to a first position adjacent to the main body and a second position spaced apart from the main body; and a toggle spring configured to elastically connect the first holder and the viewfinder, wherein a direction of an elastic force of the toggle spring is switched from a slide obstructing direction to a slide allowing direction when the viewfinder is slid.

20 Claims, 15 Drawing Sheets

(56) References Cited

FOREIGN PATENT DOCUMENTS

| | | |
|---|---|---|
| JP | 2000-188704 A | 7/2000 |
| JP | 2000-196919 A | 7/2000 |
| JP | 2000-329131 A | 11/2000 |
| JP | 2001-028700 A | 1/2001 |
| JP | 2002-077676 A | 3/2002 |
| WO | 2013/047327 A1 | 4/2013 |

* cited by examiner

ELECTRONIC VIEWFINDER CAPABLE OF PROVIDING VARIOUS PHOTOGRAPHING ANGLES TO A USER, AND PHOTOGRAPHING APPARATUS USING THE SAME

CROSS-REFERENCE TO RELATED APPLICATIONS

This application claims the priority benefit of Korean Patent Application No. 10-2013-0089831, filed on Jul. 29, 2013, in the Korean Intellectual Property Office, the disclosure of which is incorporated herein in its entirety by reference.

BACKGROUND

1. Field

One or more embodiments of the disclosure relate to electronic viewfinders capable of providing various photographing angles to a user and photographing apparatuses using the same.

2. Description of the Related Art

Photographing apparatuses record an image of a subject by using an image sensor, such as a charge-coupled device or a complementary metal-oxide-semiconductor (CMOS) device, which converts light received via a lens into an electrical signal. Examples of photographing apparatuses include digital cameras and digital camcorders.

A photographing apparatus includes a viewfinder that enables a user to view a subject by bringing his eye up to the viewfinder. Examples of the viewfinders include an optical viewfinder that receives light through a lens or a separate inlet window to allow a user to view the subject directly, and an electronic viewfinder (EVF) that converts light received from a lens into an image of the subject (e.g., using a CCD) and displays the image on a display.

Considerable effort has been made to reduce the size and thickness of photographing apparatuses. In both single-lens reflex cameras and twin-lens cameras, for example, users prefer to have a viewfinder that enables the user to check an image of a subject prior to taking a photograph.

In general, viewfinders are fixed to the main body of the photographing apparatus. When the user tries to bring his eye to the viewfinder, he may bump his face against the main body of the photographing apparatus. This may make it difficult for the user to operate the photographing apparatus.

SUMMARY

One or more embodiments of the disclosure include electronic viewfinders enabling a user to easily check a subject, and photographing apparatuses using the same.

One or more embodiments of the disclosure include electronic viewfinders capable of providing various photographing angles to a user, and photographing apparatuses using the same.

Additional aspects will be set forth in part in the description which follows and, in part, will be apparent from the description, or may be learned by practice of the embodiments.

According to one or more embodiments of the disclosure, a photographing apparatus includes: a main body including a photographing unit configured to photograph a subject; a first holder fixed to the main body; a viewfinder including a display unit and an ocular portion configured to view an image of the subject displayed on the display unit, in which the viewfinder is supported by the first holder such that the ocular portion is slid to a first position adjacent to the main body and a second position spaced apart from the main body; and a toggle spring configured to elastically connect the first holder and the viewfinder, in which a direction of an elastic force of the toggle spring is switched from a slide obstructing direction to a slide allowing direction when the viewfinder is slid.

The photographing apparatus may further include a first fixing assembly configured to fix the viewfinder at the first position and the second position.

The first fixing assembly may include: a guide slot formed at the first holder in a slide direction of the viewfinder and including a first end portion and a second end portion corresponding to the first position and the second position; and a slide protrusion provided at the viewfinder and inserted into the guide slot, in which the viewfinder is fixed to the first position and the second position by an elastic force of the toggle spring when the slide protrusion is located at the first end portion and the second end portion.

The toggle spring may include a torsion spring having a first arm and a second arm connected respectively to the first holder and the slide protrusion.

The viewfinder may be pivotally installed at the main body.

The photographing apparatus may further include a second holder supported slidably by the first holder, in which the viewfinder is pivotally connected to the second holder.

The viewfinder may be connected to the second holder pivotally in a vertical direction of the display unit when the viewfinder is located at the second position.

The photographing apparatus may further include a second fixing assembly configured to fix the viewfinder at one or more rotation angle positions.

The second fixing assembly may include a resistance member located between the viewfinder and the second holder to provide a rotational resistance to the viewfinder.

The second fixing assembly may include: a plurality of fixing grooves provided at the second holder; a fixing protrusion provided at the viewfinder and inserted into any one of the plurality of fixing grooves according to a rotation angle of the viewfinder; and an elastic member configured to apply an elastic force to the fixing protrusion to insert the fixing protrusion into the fixing groove.

According to one or more embodiments of the disclosure, an electronic viewfinder, which is installed at a main body of a digital photographing apparatus to provide a viewfinder image, includes: a first holder fixed to the main body; a viewfinder including a display unit and an ocular portion configured to view an image displayed on the display unit, in which the viewfinder is supported by the first holder such that the ocular portion is slid to a first position adjacent to the main body and a second position spaced apart from the main body; and a toggle spring configured to elastically connect the first holder and the viewfinder, in which a direction of an elastic force of the toggle spring is switched from a slide obstructing direction to a slide allowing direction when the viewfinder is slid.

The electronic viewfinder may further include a first fixing assembly configured to fix the viewfinder at the first position and the second position.

The first fixing assembly may include: a guide slot formed at the first holder in a slide direction of the viewfinder and including a first end portion and a second end portion corresponding to the first position and the second position; and a slide protrusion provided at the viewfinder and inserted into the guide slot, in which the viewfinder is fixed to the first position and the second position by an elastic force of the toggle spring when the slide protrusion is located at the first end portion and the second end portion.

The toggle spring may include a torsion spring having a first arm and a second arm connected respectively to the first holder and the slide protrusion.

The electronic viewfinder may further include a second holder supported slidably by the first holder, in which the viewfinder is pivotally connected to the second holder.

The viewfinder may be connected to the second holder pivotally in a vertical direction of the display unit when the viewfinder is located at the second position.

The electronic viewfinder may further include a second fixing assembly configured to fix the viewfinder at one or more rotation angle positions.

The second fixing assembly may include: a plurality of fixing grooves provided at any one of the viewfinder and the second holder; a fixing protrusion provided at the other of the viewfinder and the second holder and inserted into any one of the plurality of fixing grooves according to a rotation angle of the viewfinder; and an elastic member configured to apply an elastic force to the fixing protrusion to insert the fixing protrusion into the fixing groove.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
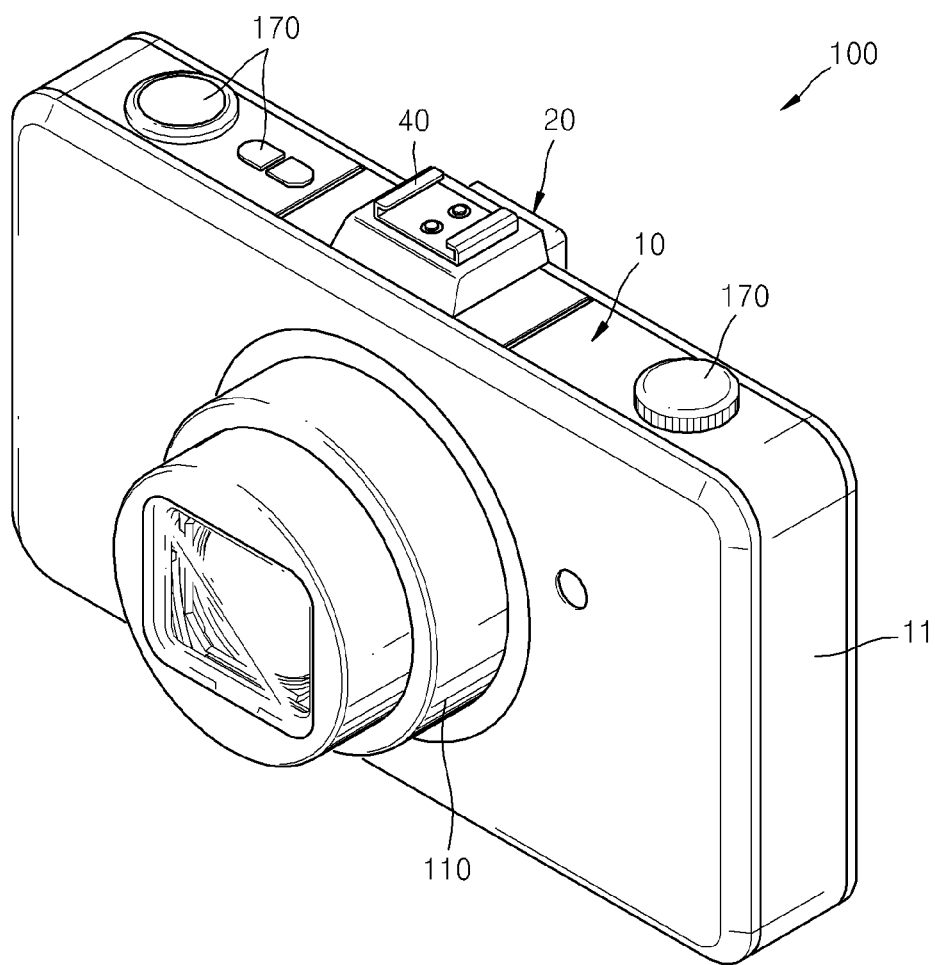
FIG. 1 is a front perspective view of a photographing apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are described below by referring to the figures.

Expressions such as "at least one of," when preceding a list of elements, modify the entire list of elements.

Figure 2:
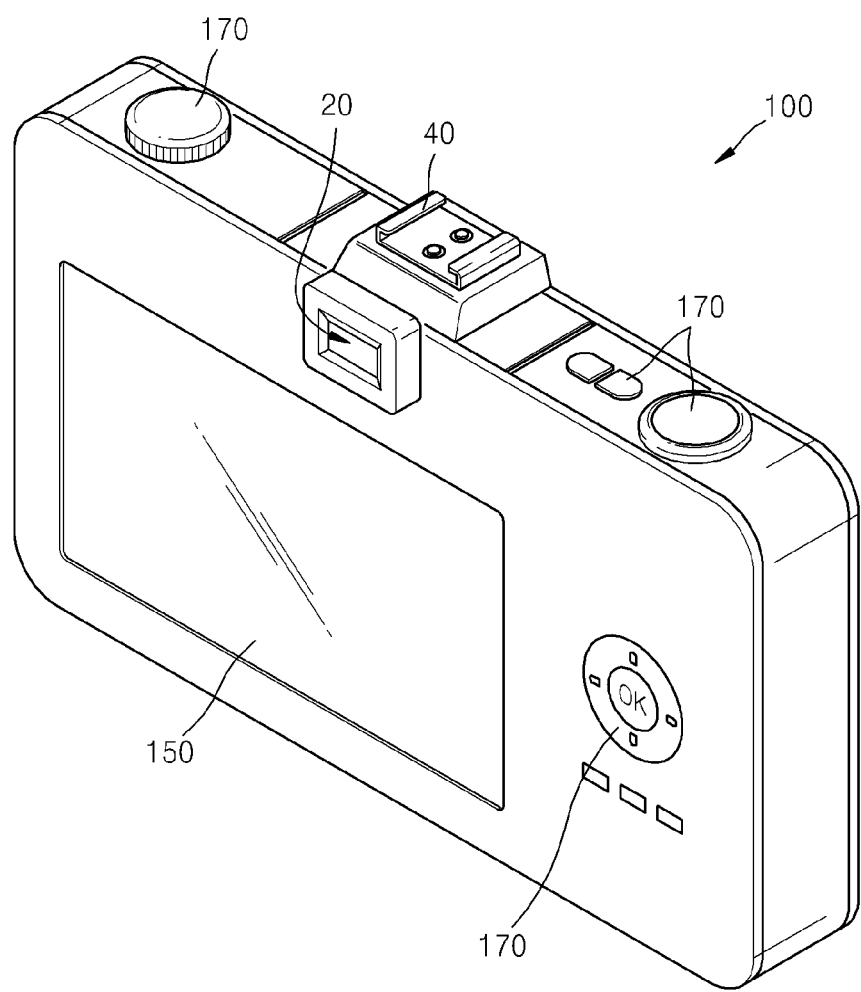
FIG. 2 is a rear perspective view of the photographing apparatus according to an embodiment.
Figure 3:
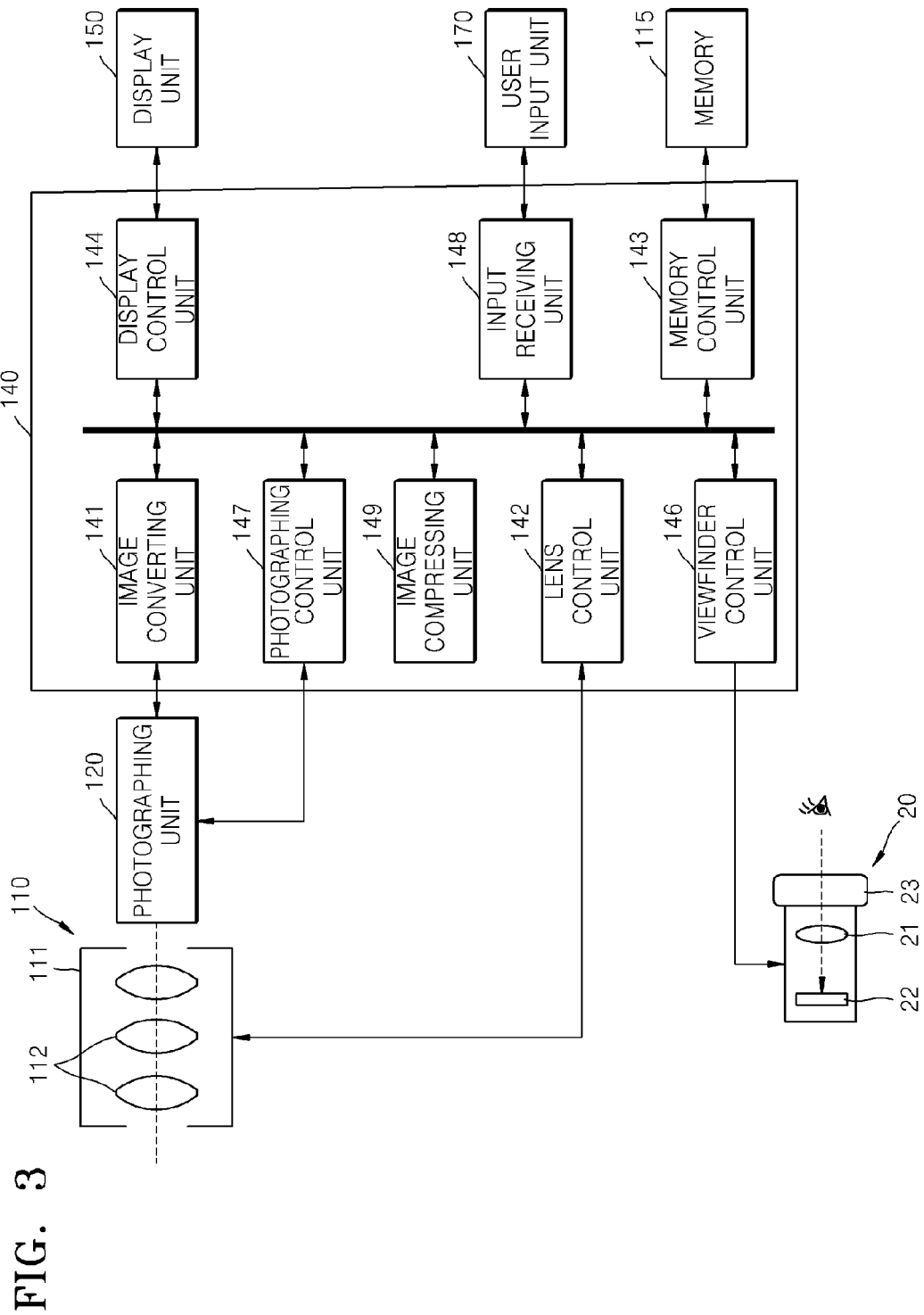
FIG. 3 is a block diagram illustrating a schematic configuration of the photographing apparatus according to an embodiment.

FIG. 1 is a front perspective view of a photographing apparatus 100 according to an embodiment. FIG. 2 is a rear perspective view of the photographing apparatus 100 illustrated in FIG. 1, according to an embodiment. FIG. 3 is a block diagram illustrating a schematic configuration of the photographing apparatus 100 according to an embodiment. The photographing apparatus 100 of an embodiment may be implemented as, for example, a digital still camera that photographs a still image, and a digital video camera that photographs a moving image.

Referring to FIGS. 1 to 3, the photographing apparatus 100 includes a main body 10 and an electronic viewfinder 20. The main body 10 includes a housing 11 that provides an external appearance for the photographing apparatus 100, and various elements for photographing. The main body 10 may include a lens unit 110, a photographing unit 120, and a control unit 140.

The control unit 140 may include an image converting unit 141, a lens control unit 142, a memory control unit 143, a display control unit 144, a viewfinder control unit 146, a photographing control unit 147, an input receiving unit 148, and an image compressing unit 149.

The lens unit 110 includes a plurality of lenses 112 and a barrel 111 supporting the lenses 112, and forms image light on an image plane of the photographing unit 120. The lenses 112 are disposed such that distances therebetween are variable. When the distances between the lenses 112 are varied, a zoom ratio or a focus may be controlled. Relative positions of the lenses 112 may be varied by driving the lenses 112 with a driving unit such as a zoom motor (not illustrated). The lenses 112 may include a zoom lens for magnifying or demagnifying a size of an image of a subject, and a focus lens for controlling a focus of a subject. The lens control unit 142 of the control unit 140 controls the positions of the lenses 112 to control a zoom ratio and a focus. The lens unit 110 may be fixed to the main body 10, and in the case of an interchangeable-type lens, the lens unit 110 may be attachable/detachable to/from the main body 10.

The photographing unit 120 includes an image sensor (not illustrated) that receives image light and converts the image light into an electrical signal. The image sensor, which may be implemented as a photoelectric conversion device, such as a charge coupled device (CCD) or a complementary metal-oxide-semiconductor (CMOS) device, converts image light, which is input through the lenses 112, into an electrical signal. The photographing unit 120 is driven by a control signal receieved from the photographing control unit 147. The electrical signal generated by the photographing unit 120 is converted into image data by the image converting unit 141. The photographing control unit 147 of the control unit 140 controls the photographing unit 120 to execute a photographing operation.

For example, the image converting unit 141 may convert the electrical signal of the photographing unit 120 into red/green/blue (RGB) data and convert the RGB data into raw data such as YUV signals including a luminance (Y) signal and a chrominance (UV) signal. For example, the conversion operation of the image converting unit 141 may include: reducing a driving noise of the photographing unit 120 included in the electrical signal by a correlated double sampling (CDS) circuit; controlling a gain of a noise-reduced signal by an automatic gain control (AGC) circuit; converting an analog signal into a digital signal by an analog-to-digital converter (ADC); and performing signal processing, such as performing pixel defect correction, gain correction, white balance correction, and gamma correction on the digital signal.

The memory control unit 143 controls recording data in a memory 115, and reading the recorded data or setting information. The memory 115 may include a volatile internal memory, for example, a semiconductor memory device such as a synchronous dynamic random access memory (SDRAM). The memory 115 may function as a buffer memory temporarily storing the image data generated by the image converting unit 141, and a working memory performing a data processing operation. Also, the memory 115 may be a nonvolatile external memory, for example, a flash memory such as a memory stick or an SD/MMC, a storage device such as an HDD, or an optical storage device such as a DVD or CD. In this case, image data compressed by the image compressing unit 149 in a format, such as a JPEG file, a TIF file, a GIF file, or a PCX file, may be stored in the memory 115.

A display unit 150 may be implemented, for example, by a display device such as a liquid crystal display (LCD) or an organic light-emitting device (OLED). Also, a touch panel for sensing a touch thereto and generating a signal corresponding to a sensed position may be disposed on a surface of the display unit 150.

A user input unit 170 may be implemented by various types of buttons as illustrated in FIGS. 1 and 2. A user may use the user input unit 170 to perform a photographing operation and an operation for checking a photographed image.

The control unit 140 is electrically connected to the photographing unit 120, the lens unit 110, the display unit 150, the user input unit 170, the memory 115, and the electronic viewfinder 20, and processes data or communicates control signals with the respective elements in order to control operations of the respective elements. The control unit 140 may be implemented by a microchip or a circuit board including a microchip, and the respective elements of the control unit 140 may be implemented by software or circuits installed in the control unit 140.

The electronic viewfinder 20 provides a viewfinder image that enables the user to check a photographing condition or a composition of a subject to be photographed. For example, the viewfinder image may be provided by displaying the image data generated by the image converting unit 141, on an electronic display unit 22 disposed in the electronic viewfinder 20. The user may view the image data displayed on the electronic display unit 22, through an ocular portion 23 of the electronic viewfinder 20. A lens 21 may be disposed between the electronic display unit 22 and the ocular portion 23. The lens 21 may include a zoom lens for magnifying an image displayed on the electronic display unit 22, and a perspective control lens for adaptation to the eyesight of the user.

Figure 4A:
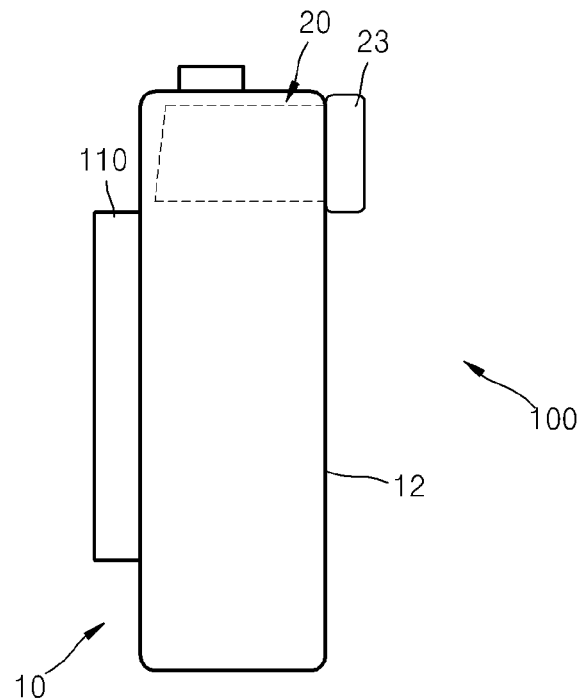
FIGS. 4A and 4B are side views of the photographing apparatus illustrated in FIG. 1, according to an embodiment.
Figure 4B:
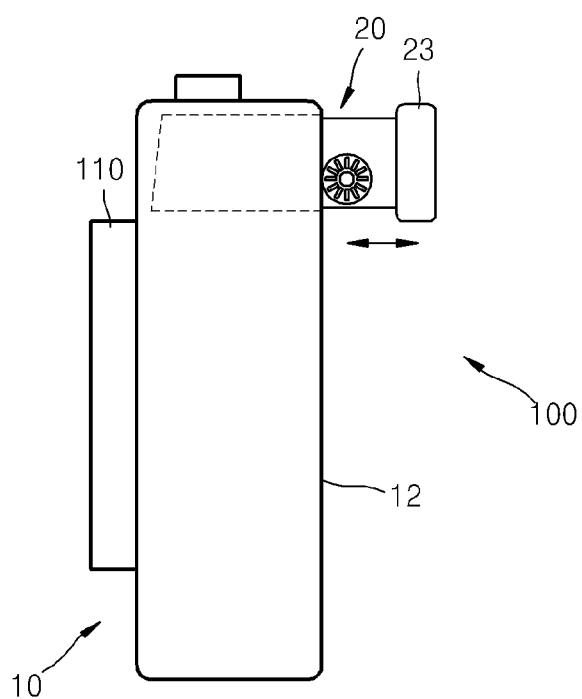

FIGS. 4A and 4B are schematic side views of the photographing apparatus 100 illustrated in FIG. 1, according to an embodiment. Referring to FIG. 4A, the ocular portion 10 of the electronic viewfinder 20 is located at a rear portion 12 of the main body 10. The rear portion 12 refers to a portion opposite to a front side at which a subject is disposed. The user may need to approach or contact his eye to the ocular portion 23 in order to view a viewfinder image. In this case, the user may not easily approach or bring his eye to the ocular portion 23 since the user's cheek or nose bumps against the rear portion 12 of the main body 10. According to an embodiment, the electronic viewfinder 20 includes a viewfinder 220 (see FIG. 5B) that is slidable between a position (first position) at which the ocular portion 23 approaches the main body 10 as illustrated in FIG. 4A, and a position (second position) at which the ocular portion 23 is slid out from the main body 10 as illustrated in FIG. 4B. Due to this configuration, the user may carry the photographing apparatus 100 with the ocular portion 23 located at the first position in a compact state as illustrated in FIG. 4A, and may easily view a viewfinder image through the ocular portion 23 in a photographing mode by locating the ocular portion 23 at the second position as illustrated in FIG. 4B.

Figure 5A:
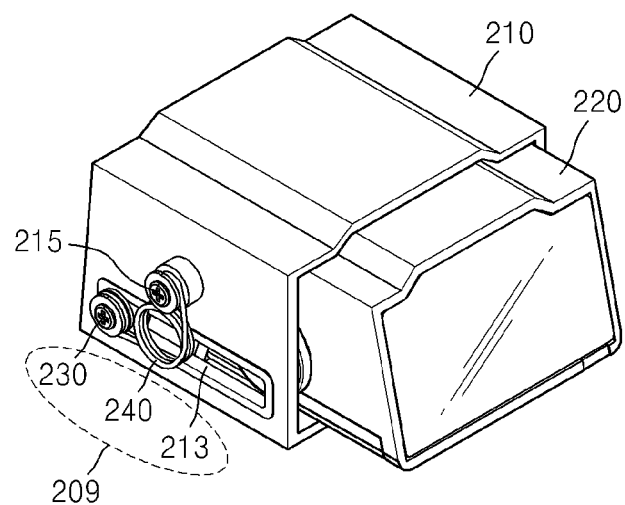
FIG. 5A is a perspective view of a slidable electronic viewfinder according to an embodiment.
Figure 5B:
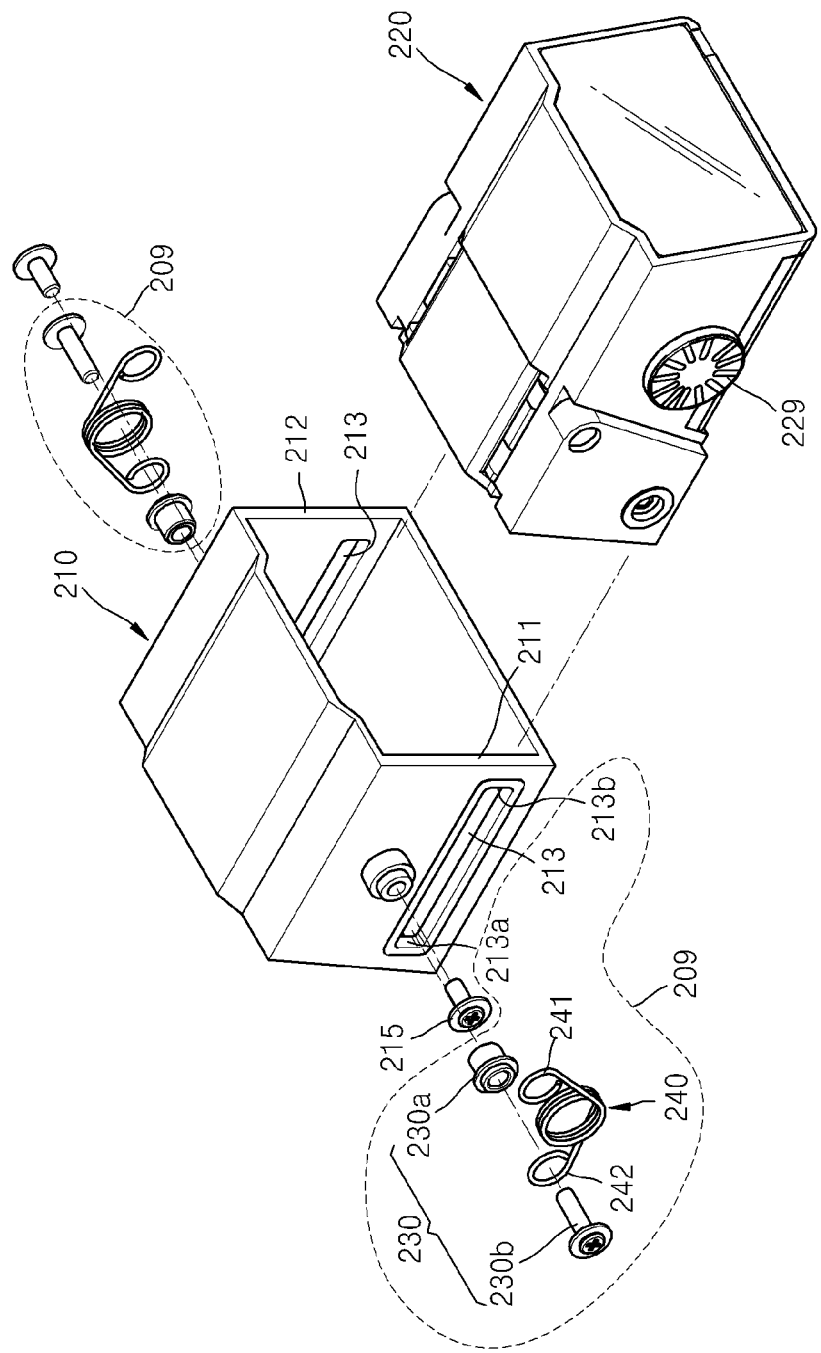
FIG. 5B is an exploded perspective view of the slidable electronic viewfinder according to an embodiment.

FIG. 5A is a perspective view of a slidable electronic viewfinder 20 according to an embodiment. FIG. 5B is an exploded perspective view of the slidable electronic viewfinder 20 according to an embodiment. Referring to FIGS. 5A and 5B, the electronic viewfinder 20 includes a first holder 210 and a viewfinder 220 that is slidably supported by the first holder 210. A knob 229 provided on a side portion of the viewfinder 220 is a perspective control knob. The viewfinder 220 includes an electronic display unit 22, a lens 21, and an ocular portion 23.

Figure 5C:
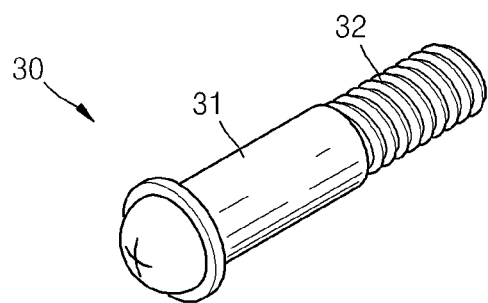
FIG. 5C is a perspective view of a slide protrusion according to an embodiment.

The first holder 210 is attached to the main body 10. For example, the first holder 210 may be hollow-shaped such that the viewfinder 220 may be slid into the first holder 210. The first holder 210 is provided with a guide slot 213 that is cut in a slide direction of the viewfinder 220. Guide slots 213 may be provided at both sidewalls 211 and 212 of the first holder 210. The viewfinder 220 is provided with a slide protrusion 230 that is inserted into the guide slot 213. First and second end portions 213a and 213b of the guide slot 213 correspond respectively to the first and second positions of the viewfinder 220. The slide protrusion 230 protrudes from both sidewalls of the viewfinder 220 and is inserted into the guide slot 213. For example, the slide protrusion 230 may include a hollow bush 230a and a fastening member 230b that fixes the hollow bush 230a to both sidewalls of the viewfinder 220. However, embodiments of the disclosure are not limited thereto. For example, as illustrated in FIG. 5C, the slide protrusion 230 may be implemented by a special screw 30 that includes a cylindrical guide portion 31 inserted into the guide slot 213 and a screw portion 32 provided at an end portion of the guide portion 31 and fastened to a sidewall of the viewfinder 220. When the slide protrusion 230 is located at the first end portion 213a of the guide slot 213, the viewfinder 220 is located at the first position; and when the slide protrusion 230 is located at the second end portion 213b of the guide slot 213, the viewfinder 220 is located at the second position.

The electronic viewfinder 20 may further include a toggle spring 240 whose elastic force direction is switched from a slide obstructing direction to a slide allowing direction when the viewfinder 220 is slid. The toggle spring 240 is configured to elastically connect the first holder 210 and the viewfinder 220. For example, referring to FIG. 5B, the toggle spring 240 may include a torsion spring that has a first arm 241 connected to the first holder 210 and a second arm 242 connected to the slide protrusion 230. For example, the first arm 241 of the toggle spring 240 may be connected to the first holder 210 by a fastening member 215. The first arm 241 is connected between the first and second end portions 213a and 213b of the guide slot 213. For example, the second arm 242 of the toggle spring 240 may be connected to the slide protrusion 230 by a fastening member 230b.

The electronic viewfinder 20 may further include a first fixing assembly 209 configured to fix the viewfinder 220 at the first position and the second position. For example, the first fixing assembly 209 may be implemented by the guide slot 213, the slide protrusion 230, and the toggle spring 240.

Figure 6A:
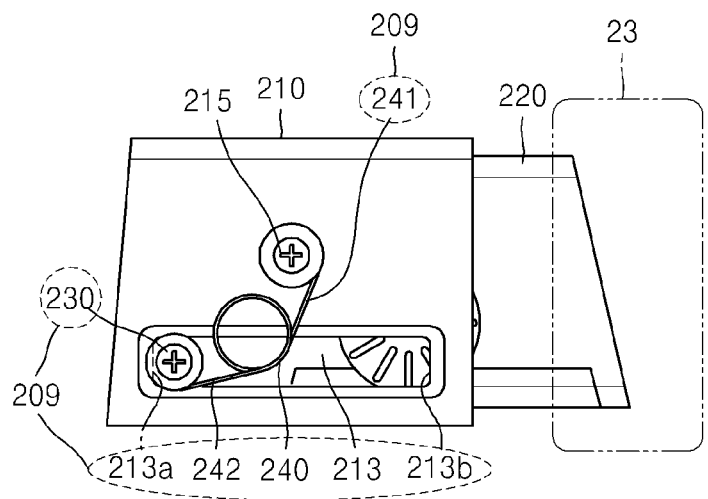
FIG. 6A is a side view of the electronic viewfinder when a viewfinder is located at a first position.
Figure 6B:
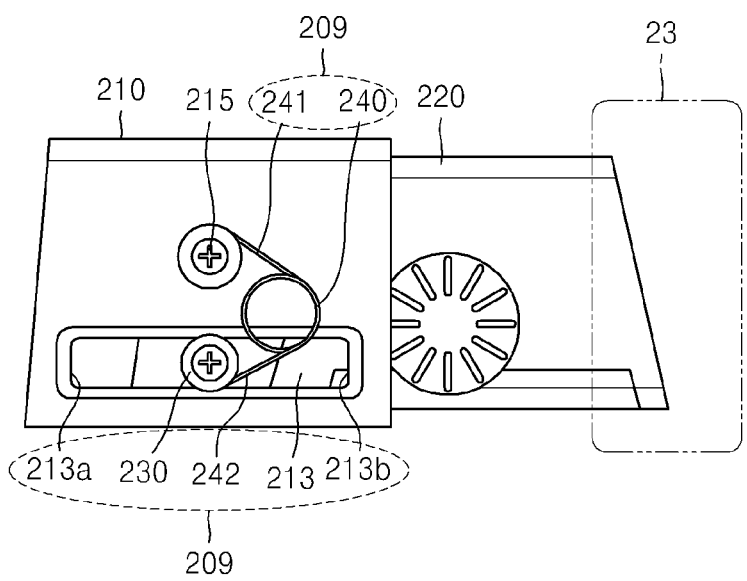
FIG. 6B is a side view of the electronic viewfinder when the viewfinder is located at an intermediate position between the first position and a second position.
Figure 6C:
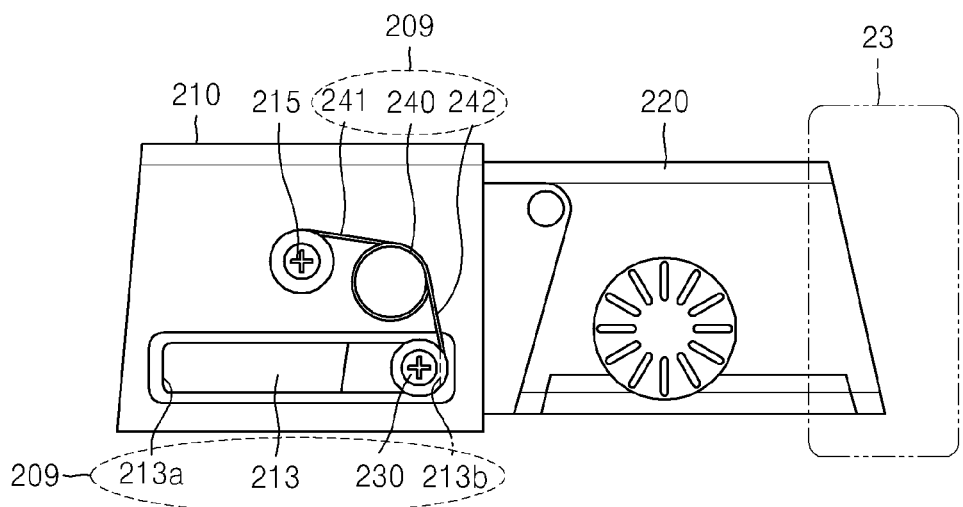
FIG. 6C is a side view of the electronic viewfinder when the viewfinder is located at the second position.

FIG. 6A is a side view of the electronic viewfinder when the viewfinder 220 is located at the first position. FIG. 6B is a side view of the electronic viewfinder when the viewfinder 220 is located at an intermediate position between the first position and the second position. FIG. 6C is a side view of the electronic viewfinder when the viewfinder 220 is located at the second position.

Referring to FIG. 6A, the slide protrusion 230 is located at the first end portion 213a of the guide slot 213. Since the second arm 242 of the toggle spring 240 is compressed against the first arm 241, the second arm 242 pushes the slide protrusion 230 toward the first end portion 213a. Therefore, an elastic force maintaining the slide protrusion 230 at the first end portion 213a is applied to the slide protrusion 230, and the viewfinder 220 is maintained at the first position unless the viewfinder 220 is forcibly pulled. When the user forcibly pulls the viewfinder 220 in the direction of an arrow of FIG. 6B, the second arm 242 is compressed against the first arm 241 and an elastic force increases gradually. The elastic force acts to obstruct the sliding of the viewfinder 220. When the pulling force on the viewfinder 220 is removed before the viewfinder 220 reaches an intermediate position illustrated in FIG. 6B, that is, a position at which the slide protrusion 230 is connected to the first arm 241, the viewfinder 220 is returned by the elastic force of the toggle spring 240 to the first position illustrated in FIG. 6A. When the viewfinder 220 exceeds the intermediate position illustrated in FIG. 6B, the direction of the elastic force applied to the slide protrusion 230 by the second arm 242 is switched to the slide allowing direction such that the second arm 242 pushes the slide protrusion 230 toward the second end portion 213b. Therefore, even when the user removes the pulling force on the viewfinder 220, the viewfinder 220 is slid to the second end portion 213b by the elastic force of the toggle spring 240. When the viewfinder 220 reaches the second position, the second arm 242 continuously provides the slide protrusion 230 with an elastic force in a direction supported by the second end portion 213b. Therefore, the viewfinder 220 is maintained at the second position unless the viewfinder 220 is forcibly pushed.

When the elastic force of the toggle spring 240 acts to obstruct the sliding of the viewfinder 220 until the viewfinder 220 reaches the intermediate position illustrated in FIG. 6B by being forcibly pushed by the user. When the viewfinder 220 exceeds the intermediate position, the direction of the elastic force is switched to slide the viewfinder 220 to the first position. Accordingly, the viewfinder 220 is returned to the first position illustrated in FIG. 6A and is maintained at the first position.

According to the above-described configuration, by moving the viewfinder 220 to the first position and the second position, the user may easily check a viewfinder image with his eye approached or contacted to the ocular portion 23, and may carry the photographing apparatus 100 with the viewfinder 220 moved from the second position to the first position in a compact state. Also, by providing the toggle spring 240, the viewfinder 220 may be easily slid to the first and second positions and fixed at the first and second positions.

Figure 7:
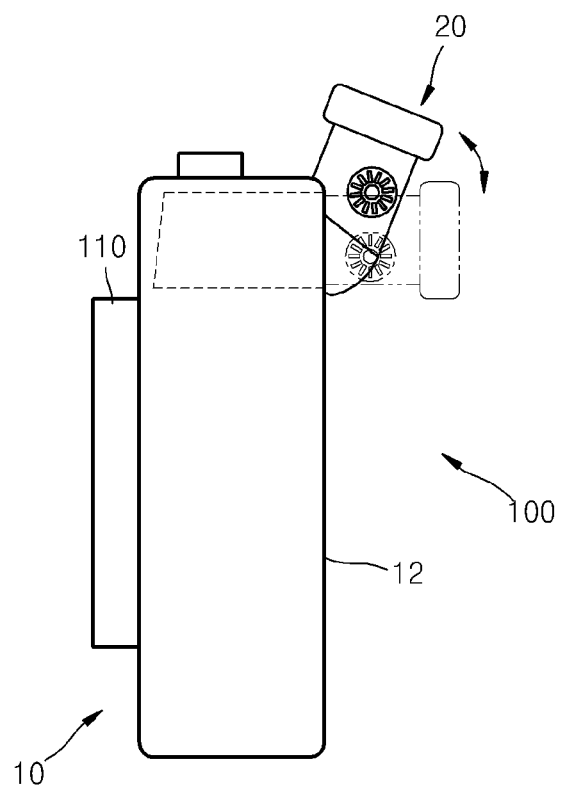
FIG. 7 is a side view of a photographing apparatus using a slidable and tiltable electronic viewfinder according to an embodiment.

FIG. 7 is a side view of a photographing apparatus 100 using a slidable and tiltable electronic viewfinder 20 according to an embodiment. Referring to FIG. 7, the ocular portion 23 may be tilted in a vertical direction, that is, the vertical direction of the electronic display unit 22. By this configuration, the user may easily check the viewfinder image through the ocular portion 23 at various photographing angles.

Figure 8:
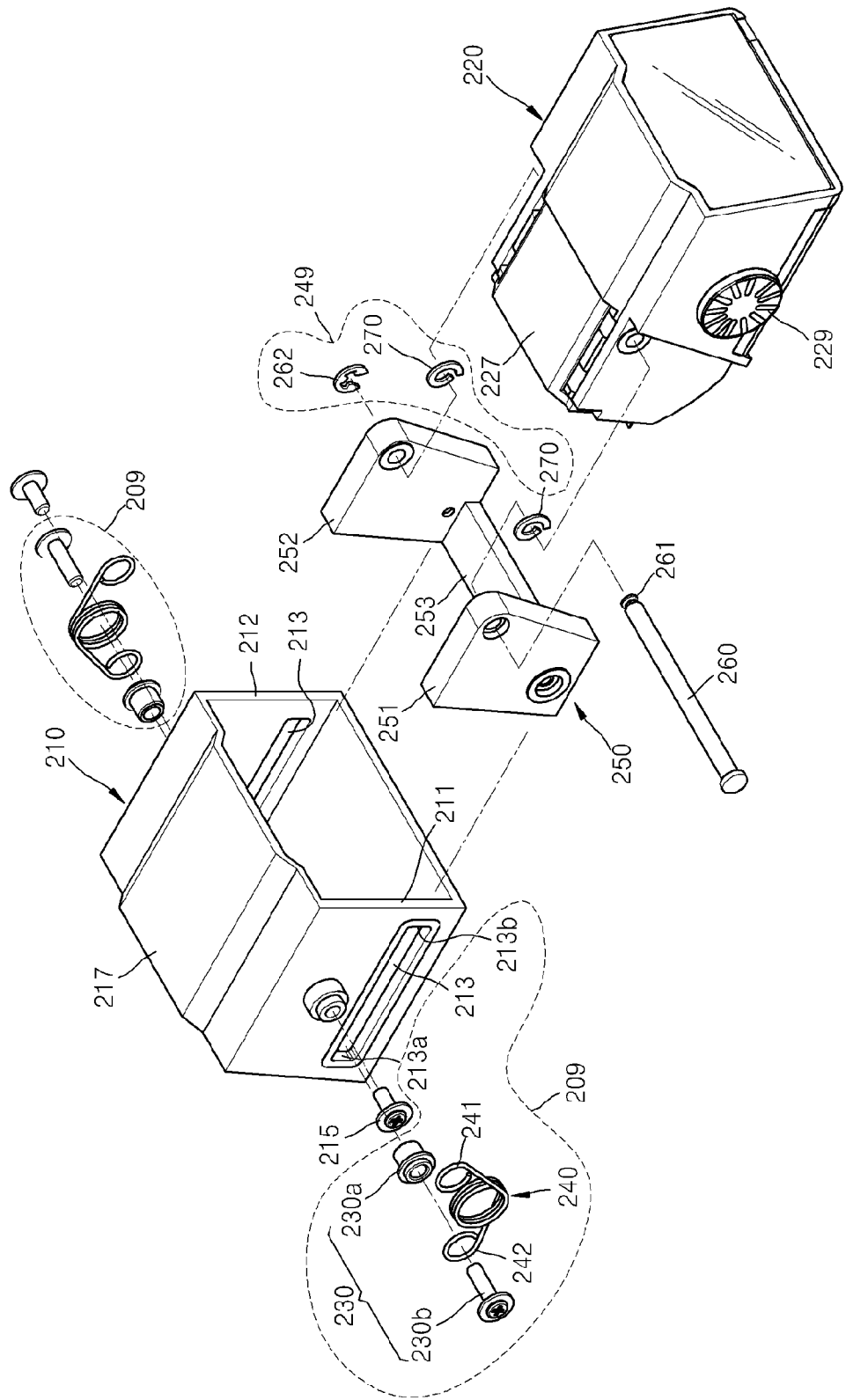
FIG. 8 is an exploded perspective view of the slidable and tiltable electronic viewfinder according to an embodiment.

FIG. 8 is an exploded perspective view of the slidable and tiltable electronic viewfinder 20 according to an embodiment.

Referring to FIG. 8, the electronic viewfinder 20 includes a first holder 210, a second holder 250 that is slidably supported by the first holder 210, and a viewfinder 220 that is pivotally supported by the second holder 250.

The second holder 250 has sidewalls 251 and 252 connected to each other by a connection arm 253. The viewfinder 220 is located between the sidewalls 251 and 252. As an example, the viewfinder 220 may be pivotally installed at a pivot shaft 260 that is installed across the sidewalls 251 and 252. By inserting the pivot shaft 260 through the sidewall 251, the viewfinder 220, and the sidewall 252 and fastening a fixing member, for example, an e-ring 262 to a groove 261 protruding to the outside of the sidewall 252, the viewfinder 220 may be connected to the second holder 250 pivotally on the pivot shaft 260. However, the structure for pivotally connecting the viewfinder 220 to the second holder 250 illustrated in FIG. 8 is merely exemplary, and the disclosure is not limited thereto.

The first holder 210 is attached to the main body 10. For example, the first holder 210 may be hollow-shaped such that the second holder 250 connected to the viewfinder 220 may be slid into the first holder 210. The first holder 210 is provided with a guide slot 213 that is cut in a slide direction of the second holder 250. Guide slots 213 may be provided at both sidewalls 211 and 212 of the first holder 210. The second holder 250 is provided with a slide protrusion 230 that is inserted into the guide slot 213. The slide protrusion 230 protrudes from both sidewalls of the second holder 250 and is inserted into the guide slot 213. For example, the slide protrusion 230 may include a hollow bush 230a and a fastening member 230b that fixes the hollow bush 230a to both sidewalls of the second holder 250. However, embodiments of the disclosure are not limited thereto. For example, as illustrated in FIG. 5C, the slide protrusion 230 may be implemented by a special screw 30 that includes a cylindrical guide portion 31 inserted into the guide slot 213 and a screw portion 32 provided at an end portion of the guide portion 31 and fastened to a sidewall of the second holder 250. When the slide protrusion 230 is located at the first end portion 213a of the guide slot 213, the viewfinder 220 is located at the first position; and when the slide protrusion 230 is located at the second end portion 213b of the guide slot 213, the viewfinder 220 is located at the second position.

The electronic viewfinder 20 may be implemented by a toggle spring 240 that elastically connects the first holder 210 and the second holder 240 and whose elastic force direction is switched from a slide obstructing direction to a slide allowing direction when the second holder 240 is slid. For example, referring to FIG. 8, the toggle spring 240 may include a torsion spring that has a first arm 241 connected to the first holder 210 and a second arm 242 connected to the slide protrusion 230. For example, the first arm 241 of the toggle spring 240 may be connected to the first holder 210 by a fastening member 215. The first arm 241 is connected between the first and second end portions 213a and 213b of the guide slot 213. For example, the second arm 242 of the toggle spring 240 may be connected to the slide protrusion 230 by a fastening member 230b.

The electronic viewfinder 20 may further include a first fixing assembly 209 configured to fix the viewfinder 220 at the first position and the second position. For example, the first fixing assembly 209 may be implemented by the guide slot 213, the slide protrusion 230, and the toggle spring 240.

Except the fact that the second holder 250 supporting the viewfinder 220 is slid instead of the viewfinder 220, an operation of moving the ocular portion 23 to the first position and the second position is the same as described with reference to FIGS. 6A to 6C.

Figure 9A:
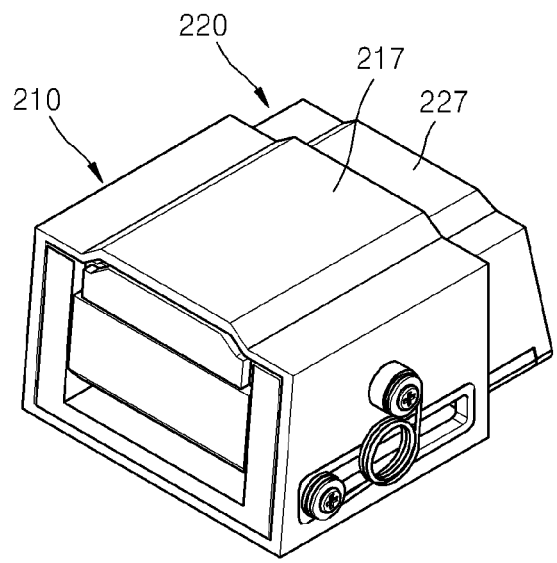
FIG. 9A is a perspective view of the electronic viewfinder when a viewfinder is located at a first position.
Figure 9B:
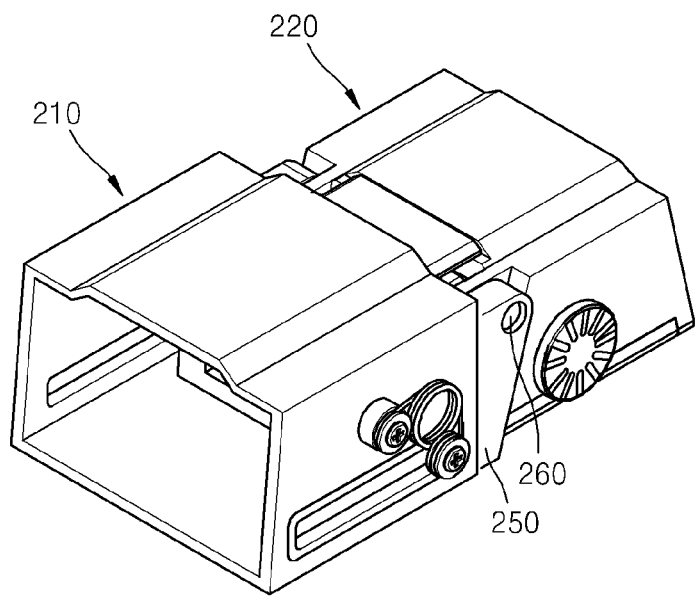
FIG. 9B is a perspective view of the electronic viewfinder when the viewfinder is located at a second position.
Figure 9C:
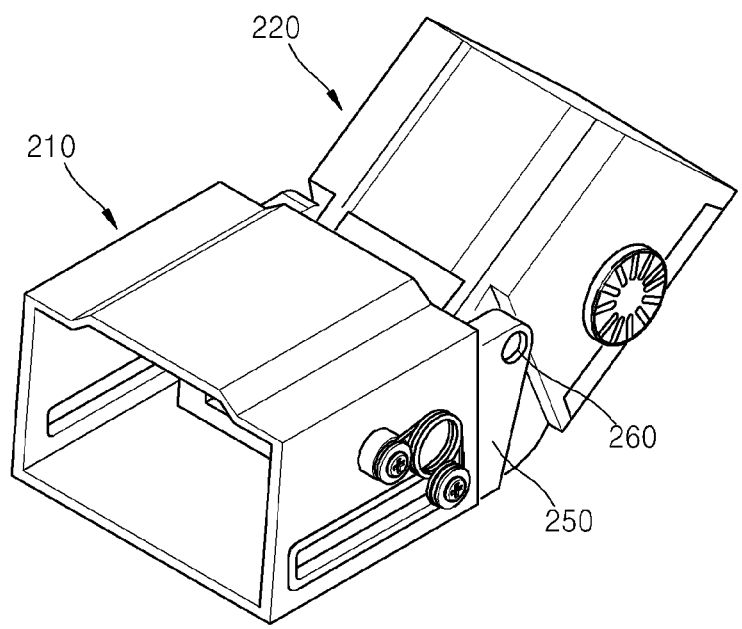
FIGS. 9C and 9D are perspective views of the electronic viewfinder when the viewfinder is tilted.
Figure 9D:
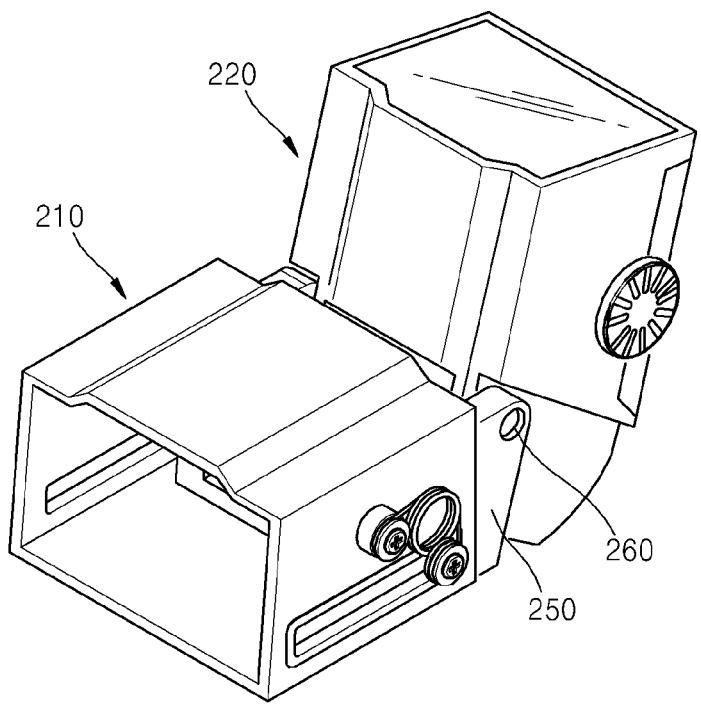

FIG. 9A is a perspective view of the electronic viewfinder when the viewfinder 220 is located at the first position. FIG. 9B is a perspective view of the electronic viewfinder when the viewfinder 220 is located at the second position. FIGS. 9C and 9D are perspective views of the electronic viewfinder when the viewfinder 220 is tilted. Referring to FIG. 9A, the pivot shaft 260 is located inside the first holder 210 when the viewfinder 220 is located at the first position. When located at the first position, the viewfinder 220 may not be pivoted, since an upper wall 217 of the viewfinder 220 is caught on an upper wall 227 of the first holder 210. As illustrated in FIG. 9B, when the ocular portion 23 is located at the second position, the pivot shaft 260 is exposed to the outside of the first holder 210. As illustrated in FIGS. 9C and 9D, when the user lifts up the viewfinder 220, the viewfinder 220 may be pivoted on the pivot shaft 260.

According to the structure of pivoting the viewfinder 220 while locating the viewfinder at the second position as described above, when the viewfinder 220 is pivoted, the viewfinder 220 may not interfere with an upper region of the main body 10 to which the electronic viewfinder 20 is attached, or an interference thereof may be minimized. Therefore, a hot-shoe 400 on which a flash unit (not illustrated) is mounted as illustrated in FIGS. 1 and 2, and functional buttons for operations may be installed on the upper region of the main body 10 to which the electronic viewfinder 20 is attached. Therefore, a degree of freedom in designing the photographing apparatus 100 may be improved, and a more compact photographing apparatus may be implemented.

The electronic viewfinder 20 may further include a second fixing assembly 249 configured to fix the viewfinder 220 at one or more pivot angle positions. As an embodiment, the second fixing assembly 249 may include a resistance member that provides a rotational resistance to the viewfinder 220. As illustrated in FIG. 8, for example, the resistance member may be implemented by a spring washer 270 that is inserted between the sidewalls 251 and 252 of the second holder 250 and the sidewalls 221 and 222 of the viewfinder 220. The pivot shaft 260 passes through the spring washer 270. The spring washer 270 applies an elastic force to the sidewalls 251 and 252 of the second holder 250 and the sidewalls 221 and 222 of the viewfinder 220 to generate a resistance force when the viewfinder 220 is rotated. By the resistance force, the viewfinder 220 may be tilted by a predetermined angle and maintained at this position.

Figure 10:
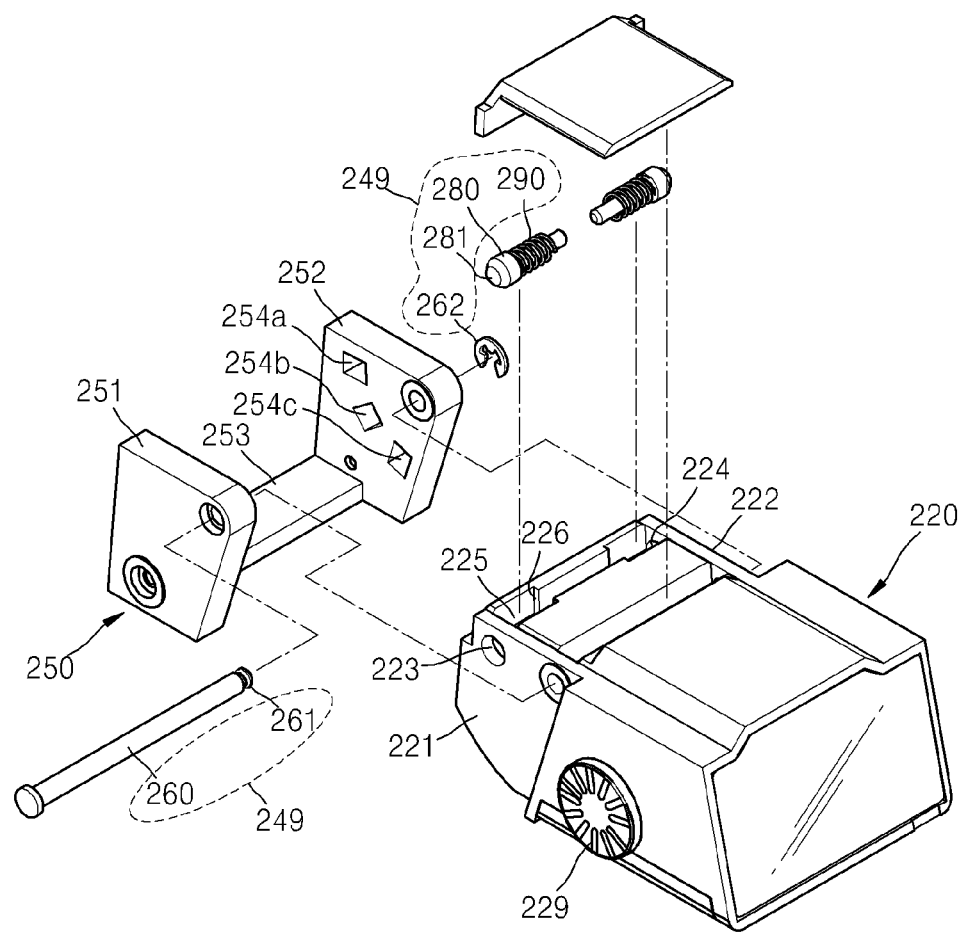
FIG. 10 is an exploded perspective view of a second fixing assembly according to another embodiment.

FIG. 10 is an exploded perspective view of the second fixing assembly 249 according to another embodiment. Referring to FIG. 10, the second holder 250 is provided with a plurality of fixing grooves 250a, 250b and 250c, and the viewfinder 220 is provided with a fixing protrusion 280 that is inserted into any one of the fixing grooves 250a, 250b and 250c according to a rotation angle thereof. For example, centered on the pivot shaft 260, the fixing grooves 250a, 250b and 250c may be disposed to correspond respectively to rotation angles 0°, 35° and 70° of the viewfinder 220. The fixing grooves 250a, 250b and 250c may be formed to be concave from the inner surfaces of the sidewalls 251 and 252 of the second holder 250, and may be formed to pass through the sidewalls 251 and 252. The fixing protrusion 280 is disposed at an installation groove 225 that extends in a horizontal direction of the viewfinder 220, that is, a direction of the pivot shaft 260. One end portion 281 of the fixing protrusion 280 protrudes from the sidewalls 221 and 222 through through-holes 223 and 224 provided at the sidewalls 221 and 222 of the viewfinder 220, and is inserted into any one of the fixing grooves 250a, 250b and 250c. An elastic member 290 applies an elastic force to the fixing protrusion 280 in a direction in which the end portion 281 protrudes from the sidewalls 221 and 222 and is inserted into the fixing grooves 250a, 250b and 250c. For example, the elastic member 290 may be a compressive coil spring that has one end portion supported by an end portion of the installation groove 225 and the other end portion supported by the fixing protrusion 280. The end portion 281 of the fixing protrusion 280 may be round-shaped such that it may be smoothly inserted into the fixing grooves 250a, 250b and 250c and may be smoothly detached from the fixing grooves 250a, 250b and 250c by a predetermined strength of force rotating the viewfinder 220.

Figure 11A:
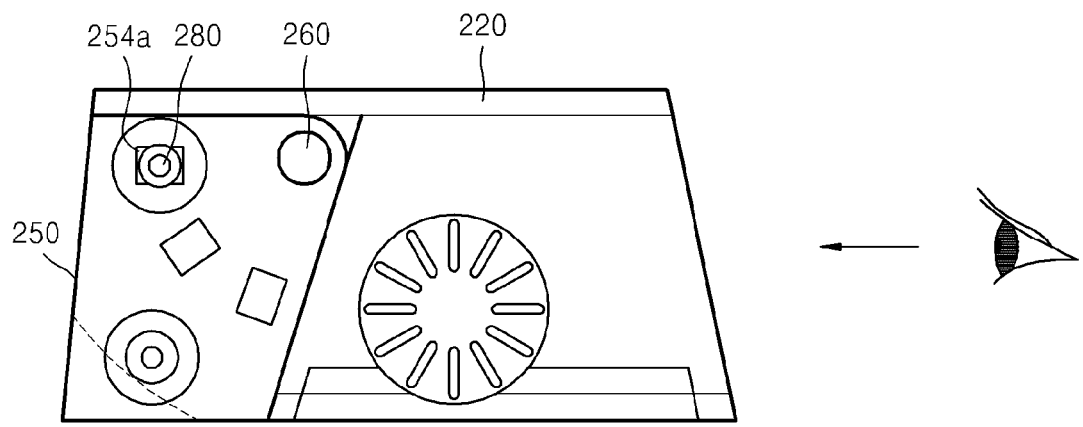
FIGS. 11A, 11B and 11C are views illustrating states in which a fixing protrusion is caught in different fixing grooves.
Figure 11B:
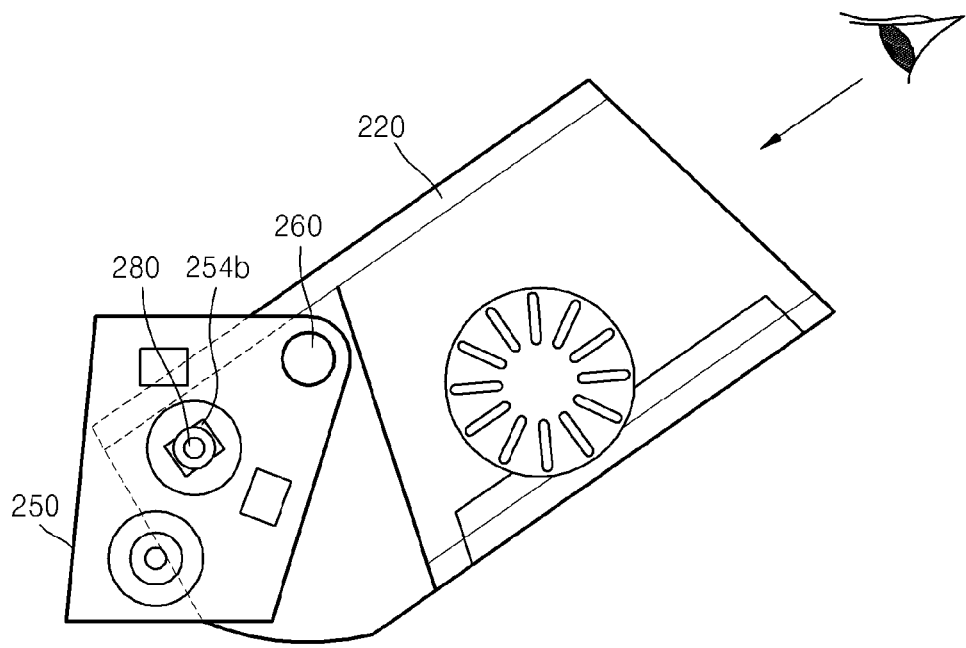
Figure 11C:
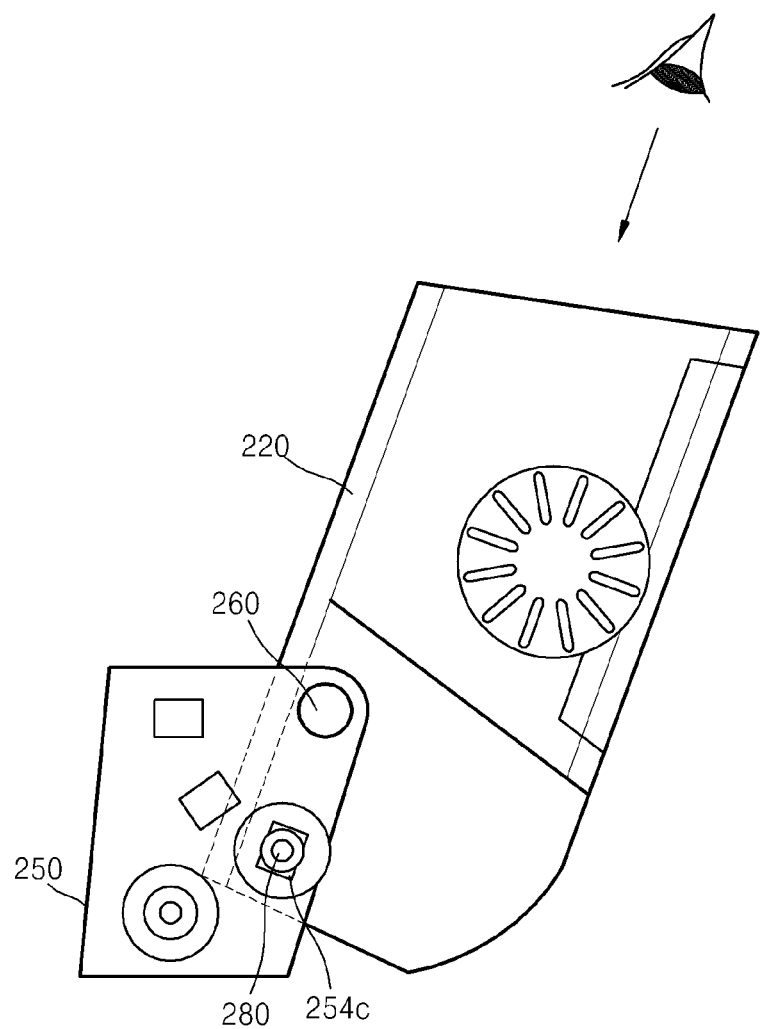

FIGS. 11A, 11B and 11C are views illustrating states in which the fixing protrusion 280 is caught in fixing grooves 254a, 254b and 254c, respectively. Referring to FIG. 11A, when the viewfinder 220 is located at the second position, the fixing protrusion 280 is inserted into the fixing groove 254a and the viewfinder 220 is maintained at a tilt angle of about 0°. When the user forcibly lifts up the viewfinder 220, the fixing protrusion 280 is caught on an edge of the fixing groove 254a, pushed in an opposite direction of the elastic force of the elastic member 290, and detached from the fixing groove 254a. When the viewfinder 220 is rotated and the fixing protrusion 280 faces the fixing groove 254b, the fixing protrusion 280 is inserted into the fixing groove 254b by the elastic force of the elastic member 290, and the viewfinder 220 is maintained at a tilt angle of about 35°. When the user forcibly lifts up the viewfinder 220 again, the fixing protrusion 280 is detached from the fixing groove 254b. When the viewfinder 220 is rotated and the fixing protrusion 280 faces the fixing groove 254c, the fixing protrusion 280 is inserted into the fixing groove 254c by the elastic force of the elastic member 290, and the viewfinder 220 is maintained at a tilt angle of about 70°.

It should be understood that the exemplary embodiments described therein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The use of any and all examples, or exemplary language (e.g., "such as") provided herein, is intended merely to better illuminate the embodiments and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the disclosure have been described with reference to the figures, it will be understood by those of ordinary skill in the art that various changes in form and details may be made therein without departing from the spirit and scope of the disclosure as defined by the following claims.

What is claimed is:

1. A photographing apparatus comprising:
   a main body comprising a photographing unit configured to photograph a subject;
   a first holder fixed to the main body;
   a viewfinder comprising a display unit and an ocular portion configured to view an image of the subject displayed on the display unit, wherein the viewfinder is supported by the first holder such that the ocular portion is slid to a first position adjacent to the main body and a second position spaced apart from the main body; and
   a toggle spring configured to elastically connect the first holder and the viewfinder, wherein a direction of an elastic force of the toggle spring is switched from a slide obstructing direction to a slide allowing direction when the viewfinder is slid.

2. The photographing apparatus of claim 1, further comprising a first fixing assembly configured to fix the viewfinder at the first position and the second position.

3. The photographing apparatus of claim 2, wherein the first fixing assembly comprises:
   a guide slot formed at the first holder in a slide direction of the viewfinder and comprising a first end portion and a second end portion corresponding to the first position and the second position; and
   a slide protrusion provided at the viewfinder and inserted into the guide slot,
   wherein the viewfinder is fixed to the first position and the second position by an elastic force of the toggle spring when the slide protrusion is located at the first end portion and the second end portion.

4. The photographing apparatus of claim 3, wherein the toggle spring comprises a torsion spring having a first arm and a second arm connected respectively to the first holder and the slide protrusion.

5. The photographing apparatus of claim 1, wherein the viewfinder is pivotally installed at the main body.

6. The photographing apparatus of claim 5, further comprising a second holder supported slidably by the first holder, wherein the viewfinder is pivotally connected to the second holder.

7. The photographing apparatus of claim 6, wherein the viewfinder is connected to the second holder pivotally in a vertical direction of the display unit when the viewfinder is located at the second position.

8. The photographing apparatus of claim 7, further comprising a second fixing assembly configured to fix the viewfinder at one or more rotation angle positions.

9. The photographing apparatus of claim 8, wherein the second fixing assembly comprises a resistance member located between the viewfinder and the second holder to provide a rotational resistance to the viewfinder.

10. The photographing apparatus of claim 8, wherein the second fixing assembly comprises:
    a plurality of fixing grooves provided at the second holder;
    a fixing protrusion provided at the viewfinder and inserted into any one of the plurality of fixing grooves according to a rotation angle of the viewfinder; and
    an elastic member configured to apply an elastic force to the fixing protrusion to insert the fixing protrusion into the fixing groove.

11. The photographing apparatus of claim 1, wherein:
    the toggle spring has a first end connected to the first holder and a second end connected to the viewfinder, and exerts the elastic force between its ends;
    in the first position the direction of the elastic force of the toggle spring on the viewfinder is a first direction towards the first position;
    in the second position the direction of the elastic force of the toggle spring on the viewfinder is a second direction towards the second position; and
    as the viewfinder is slid from the first position to the second position or from the second position to the first position the direction of the elastic force switches between the first and second directions.

12. An electronic viewfinder installed at a main body of a digital photographing apparatus to provide a viewfinder image, comprising:
    a first holder fixed to the main body;
    a viewfinder comprising a display unit and an ocular portion configured to view an image displayed on the display unit, wherein the viewfinder is supported by the first holder such that the ocular portion is slid to a first position adjacent to the main body and a second position spaced apart from the main body; and
    a toggle spring configured to elastically connect the first holder and the viewfinder, wherein a direction of an elastic force of the toggle spring is switched from a slide obstructing direction to a slide allowing direction when the viewfinder is slid.

13. The electronic viewfinder of claim 12, further comprising a first fixing assembly configured to fix the viewfinder at the first position and the second position.

14. The electronic viewfinder of claim 13, wherein the first fixing assembly comprises:
    a guide slot formed at the first holder in a slide direction of the viewfinder and comprising a first end portion and a second end portion corresponding to the first position and the second position; and
    a slide protrusion provided at the viewfinder and inserted into the guide slot, wherein the viewfinder is fixed to the first position and the second position by an elastic force of the toggle spring when the slide protrusion is located at the first end portion and the second end portion.

15. The electronic viewfinder of claim 14, wherein the toggle spring comprises a torsion spring having a first arm and a second arm connected respectively to the first holder and the slide protrusion.

16. The electronic viewfinder of claim 12, further comprising a second holder supported slidably by the first holder, wherein the viewfinder is pivotally connected to the second holder.

17. The electronic viewfinder of claim 16, wherein the viewfinder is connected to the second holder pivotally in a vertical direction of the display unit when the viewfinder is located at the second position.

18. The electronic viewfinder of claim 16, further comprising a second fixing assembly configured to fix the viewfinder at one or more rotation angle positions.

19. The electronic viewfinder of claim 18, wherein the second fixing assembly comprises:
    a plurality of fixing grooves provided at any one of the viewfinder and the second holder;
    a fixing protrusion provided at the other of the viewfinder and the second holder and inserted into any one of the plurality of fixing grooves according to a rotation angle of the viewfinder; and
    an elastic member configured to apply an elastic force to the fixing protrusion to insert the fixing protrusion into the fixing groove.

20. The electronic viewfinder of claim 12, wherein:
    the toggle spring has a first end connected to the first holder and a second end connected to the viewfinder, and exerts the elastic force between its ends;
    in the first position the direction of the elastic force of the toggle spring on the viewfinder is a first direction towards the first position;
    in the second position the direction of the elastic force of the toggle spring on the viewfinder is a second direction towards the second position; and
    as the viewfinder is slid from the first position to the second position or from the second position to the first position the direction of the elastic force switches between the first and second directions.

* * * * *